Aug. 28, 1956 C. G. MORSCHING 2,761,126
OPERATING SIGNAL FOR A PLANTER OR OTHER MACHINE
Filed Sept. 25, 1952
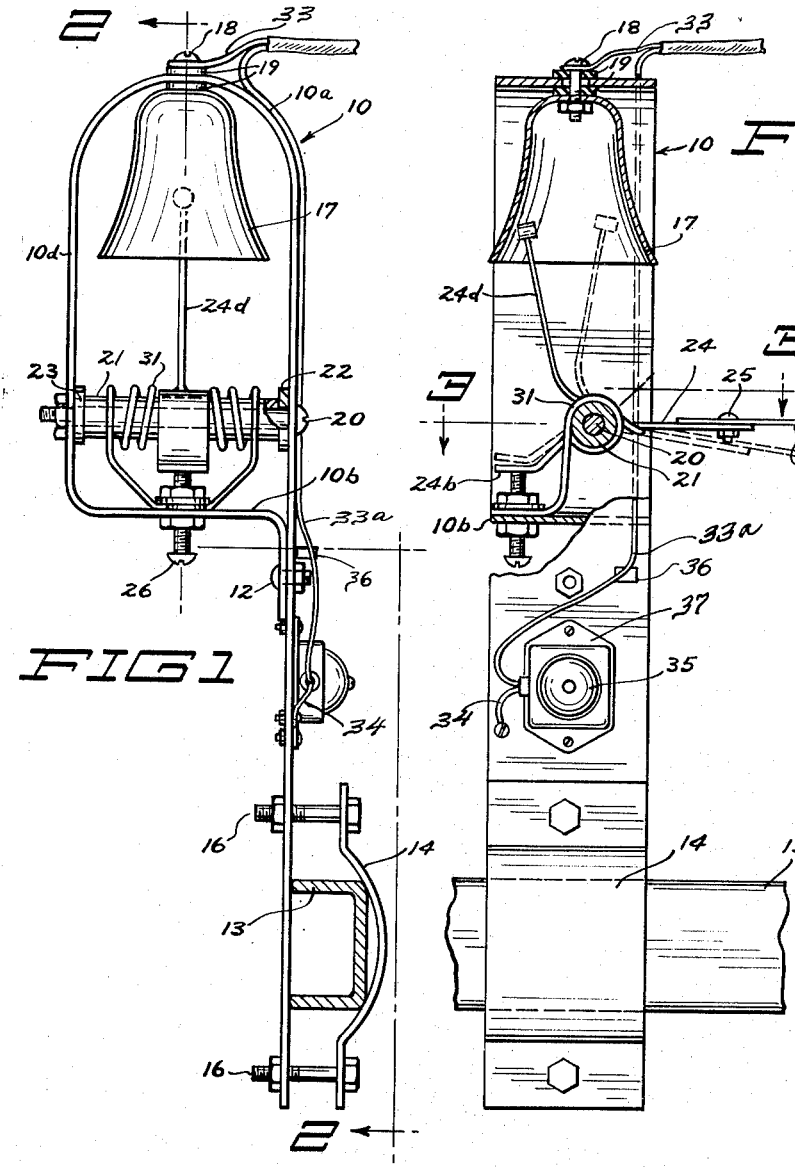
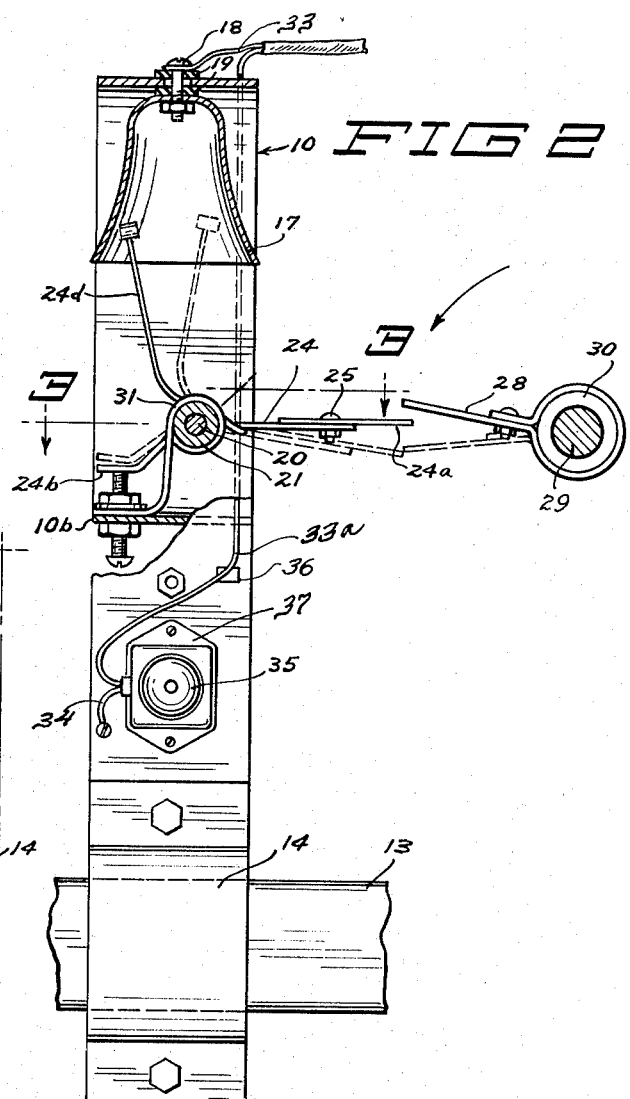
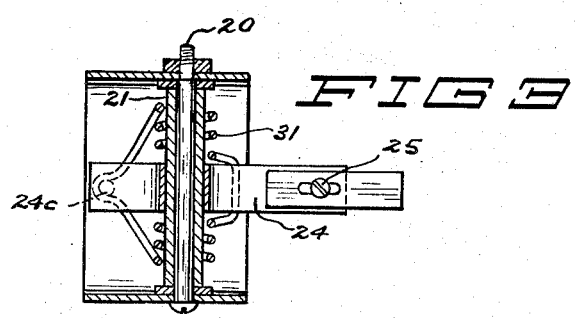
INVENTOR.
CLARENCE G. MORSCHING
BY
ATTORNEYS

United States Patent Office 2,761,126
Patented Aug. 28, 1956

2,761,126

OPERATING SIGNAL FOR A PLANTER OR OTHER MACHINE

Clarence G. Morsching, Waseca, Minn.

Application September 25, 1952, Serial No. 311,463

1 Claim. (Cl. 340—271)

This invention relates to a signal device to be used on a planting machine, such as a corn planter, grain drill or other machine. It is desirable to have an audible signal indicate that the seeding mechanism of the planter is in operation and that seeds are being planted. In practice it has been found that the clutch which operates the seeding mechanism does not always stay in operating position but may be jarred or otherwise moved out of said position. Hence a good portion of a field may be traversed without being planted and without the operator being aware of this condition. It is often desired to operate machines at night so that a luminous signal is desirable.

It is an object therefore of this invention to provide a signal device to be used on a planter or other machine and to be actuated by the member which operates the seeding mechanism and which will give an audible or other signal when said seeding mechanism is in operation.

It is another object of this invention to provide a signal device to be used on a planter or other machine comprising a bell carried on said planter, a lever oscillatably secured to said planter and carrying a tapper for striking said bell, and adapted to be moved in one direction by the member on said machine which operates the seeding mechanism, and movable in the opposite direction by a spring whereby said bell will give an audible signal while said seeding mechanism is in operation.

It is still another object of this invention to provide a signal device to be used on a planter or other machine comprising a bell carried in a frame secured to a planter, an arm oscillatably secured in said frame and adapted to strike said bell, an arm carried by a member adapted to actuate the seeding mechanism of said machine and adapted to move said first mentioned arm in one direction, a spring secured to said first mentioned arm and adapted to oscillate said first mentioned arm in the opposite direction, and a stop for limiting the movement of said arm.

It is a further object of the invention to provide a signal device to be used on a planter comprising a bell mounted on said planter, a lever oscillatably mounted on said planter and carrying a tapper adapted to strike said bell, said planter having a rotating member for operating the seeding mechanism and adapted to move said lever in one direction, a spring secured to said lever and adapted to move the same in the opposite direction, an electrical signal carried on said planter, an electrical circuit containing said first mentioned signal device, said tapper and contacts, whereby said electrical circuit is closed when said tapper strikes said first mentioned signal whereby both signals operate when said seeding mechanism is in operation.

These and other objects and advantages of the invention will be fully set forth in the following description made in connection with the accompanying drawings in which like reference characters refer to similar parts throughout the several views and in which:

Fig. 1 is a view in front elevation;

Fig. 2 is a view taken on line 2—2 of Fig. 1, as indicated by the arrows, with some parts broken away, some parts sectional and some parts in dotted line; and Fig. 3 is a view taken on line 3—3 of Fig. 2, as indicated by the arrows.

Referring to the drawings, a frame 10 is shown. Said frame as shown is made of a strip of sheet metal having an upper portion bent to have a semi-cylindrical top 10a, a horizontal intermediate portion 10b and sides 10c and 10d. Portion 10b has an inner end portion bent downwardly and secured to side 10c by a nutted bolt 12. Side 10c extends downwardly for a substantially greater distance than side 10b and is secured to frame member 13 of a planter or other similar machine by clamp member 14 and nutted bolts 16.

A bell 17 depends from the upper end of portion 10a and is secured thereto by a nutted bolt 18. Insulating washers 19 are disposed at each side of said bell having alined apertures through which bolt 18 passes. A headed and nutted rod or shaft 20 extends between sides 10c and 10d and is secured therebetween. Rod 20 has a reduced threaded portion forming a shoulder, which shoulder engages the inner side of portion 10d, so as to properly space portions 10a and 10d. A sleeve 21 is rotatably mounted on rod 20 and is substantially coextensive therewith. Dust washers 22 and 23 are disposed on said rod 20 adjacent the ends of sleeve 21.

A lever 24 is secured to sleeve 21 and has an arm extending outwardly horizontally therefrom. A longitudinally adjustable extension 24a having an elongated slot therein is secured to member 24 by a headed and nutted bolt 25. Said lever 24 has an inwardly extending portion 24b adapted to engage a stop member 26 which is secured to said horizontal portion 10b. Said stop member is here shown as a nutted bolt disposed in said portion 10b and adapted for adjustment upwardly and downwardly. Carried by lever 24 and extending upwardly therefrom into bell member 17 is an arm 24d having an enlarged portion or tapper at its end made of metal. Said bell could have a small piece of tungsten or other metal thereon to constitute a contact point for said tapper. In the embodiment of this invention as illustrated, said tapper arm 24d is made of flat resilient or spring steel with an enlarged preferably cylindrical head portion. Lever portion 24a extends into the path of a rotating arm 28 which will be secured to a rotating member of a machine such as a planter, such as shaft 29. Shaft 29 will be driven by a wheel of said machine (not shown) which operates the seeding mechanism and which is put into operating position by a clutch. This latter is a construction well known in the art and forms no part of the present invention.

A helical torsion spring 31 is disposed about sleeve 21 and to lever 24 and has its lower end portions secured to portion 10b by bolt 26. Said spring moves arm and tapper 24d and lever 24 to one position.

An electrical conductor 33 leading to a source of electrical energy, which may be a storage battery, has one terminal 33a secured to bolt 18 adjacent the head thereof. Another conductor 33a from said source extends to one terminal of a signal member 35 mounted on a plate 37 which is secured to frame 10a. Said signal member may be a buzzer or a light bulb. As here shown, said plate 37 is made of fiber material. A conductor 34 extends from the other terminal or contact of signal 35 to the frame 10a. A condenser 36 is preferably inserted in conductor 33a.

In operation, when the seeding mechanism of the corn planter or other machine is thrown into operation by a clutch, a wheel revolves and operates a feeding mechanism for feeding the seed, such as seed corn in a corn planter. Shaft 30 and the arm 28 carried by it rotate. As arm 28 rotates, it strikes the end of lever 24 and moves the same against the tension of torsion spring 31 and then moves past said lever. Portion 24a can be nicely positioned to get the desired action and gives an audible signal so that the driver of the planter will know that the feeding mechanism is operating. Tapper 24d is normally positioned as shown near bell 17 at the left side thereof as seen in Fig. 2. When arm 28 passes arm 24, spring 31 swings lever 24 counterclockwise and portion 24b strikes stop 26 and is stopped. Due to the resiliency of arm 24d the latter continues its motion and the tapper strikes the bell sharply.

As shown in the embodiment of the invention illustrated, applicant's device may also include an electrically operated signal. When the hammer on member 24d contacts bell 17, a circuit will be closed, which circuit includes conductor 33, bell 17, member 24d, frame 10b, conductor 34, buzzer 35 and conductor 33a including condenser 36. The signal member 35 will then give an additional signal. Said signal member 35 may be a buzzer or a light bulb to be used during a night time seeding operation. Further assurance is thus given that the seeding mechanism is in operation. The buzzer or light 35 can be placed quite close to the operator. The device could embody a plurality of planters or other machines each of which could carry its signal.

Thus it is seen that I have provided a simple and efficient signal device to be used on a planting machine which gives positive notice to the operator that the seed feeding mechanism is in operation. The condenser will act to prevent sparking when said circuit is broken. Stop member 26 will be positioned so that the tapper will strike bell 17 properly and so that said tapper will not strike the opposite side of the bell.

Applicant's device has been amply tested in actual operation and has proved to be very successful.

It will of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claim.

What is claimed is:

A signal device to be used with a planting or other machine having a member operating the seeding mechanism having in combination, a frame secured to said planter, a bell made of material forming an electrical conductor carried by said frame, a lever oscillatable in said frame and having a resilient arm carrying a tapper for engaging said bell, said arm and tapper forming an electrical conductor said member having means for moving said lever in one direction, a spring for moving said lever in the opposite direction to cause said tapper to engage said bell, an electrical signal having spaced contacts comprising said bell and said arm and tapper whereby said resilient arm will move said tapper against said bell and close said circuit and said electrical signal will be actuated and said tapper and bell constitute a mechanical signal and also constitute actuating conductors and contacts for said electrical signal.

References Cited in the file of this patent
UNITED STATES PATENTS

| | | |
|---|---|---|
| 379,745 | Ulsh | Mar. 20, 1888 |
| 419,312 | Bulluck | Jan. 14, 1890 |
| 475,066 | Ricketson | May 17, 1892 |
| 2,441,185 | Brown et al. | May 11, 1948 |